US009325251B2

(12) United States Patent
Bousfield, III et al.

(10) Patent No.: US 9,325,251 B2
(45) Date of Patent: Apr. 26, 2016

(54) POWER DELIVERY SYSTEMS AND METHODS FOR OFFSHORE APPLICATIONS

(71) Applicants: John Channing Bousfield, III, Murrysville, PA (US); Mukul Rastogi, Murrysville, PA (US); Elena V. Koneva, Monroeville, PA (US)

(72) Inventors: John Channing Bousfield, III, Murrysville, PA (US); Mukul Rastogi, Murrysville, PA (US); Elena V. Koneva, Monroeville, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 364 days.

(21) Appl. No.: 14/013,215

(22) Filed: Aug. 29, 2013

(65) Prior Publication Data

US 2014/0063871 A1 Mar. 6, 2014

Related U.S. Application Data

(60) Provisional application No. 61/695,051, filed on Aug. 30, 2012.

(51) Int. Cl.
| | |
|---|---|
| *H02M 5/45* | (2006.01) |
| *H02M 5/458* | (2006.01) |
| *H02J 5/00* | (2006.01) |
| *H02M 7/48* | (2007.01) |
| *H02M 7/49* | (2007.01) |
| *H02M 7/483* | (2007.01) |

(52) U.S. Cl.
CPC .............. *H02M 5/4585* (2013.01); *H02J 5/00* (2013.01); *H02M 7/4807* (2013.01); *H02M 7/49* (2013.01); *H02M 2007/4835* (2013.01); *Y10T 29/49117* (2015.01)

(58) Field of Classification Search
CPC ..... H02M 5/4587; H02M 7/4807; H02M 7/49; H02M 2007/4835; H02J 3/32; H02J 3/36; H02J 5/00
See application file for complete search history.

(56) References Cited

U.S. PATENT DOCUMENTS

| | | | |
|---|---|---|---|
| 5,638,263 A | 6/1997 | Abrams | |
| 5,901,053 A * | 5/1999 | Eriksson | H02J 3/36 363/35 |
| 7,269,037 B2 | 9/2007 | Marquardt | |
| 7,960,871 B2 | 6/2011 | Dommaschk | |
| 2008/0205093 A1* | 8/2008 | Davies | H02J 3/1864 363/35 |
| 2009/0312885 A1* | 12/2009 | Buiel | H02J 3/32 700/297 |
| 2012/0300510 A1* | 11/2012 | Jensen | H02J 3/36 363/35 |

* cited by examiner

*Primary Examiner* — Matthew Nguyen

(57) ABSTRACT

A system for delivering power to an offshore load is disclosed. The system may include an on-land source of three-phase power, an on-land AC-to-DC power conversion module, a DC transmission line, and an offshore DC-to-AC power inverter. The on-land AC-to-DC power conversion module may be configured to convert the three-phase power to DC power. The DC transmission line may have a source end and a load end, where the source end is configured to receive DC power from the on-land AC-to-DC power conversion module. The offshore DC-to-AC power inverter may be configured to receive DC power from the DC transmission line, convert the DC power to three-phase AC power, and deliver the three-phase AC power to an offshore load.

18 Claims, 10 Drawing Sheets

POWER DELIVERY SYSTEMS AND METHODS FOR OFFSHORE APPLICATIONS

CROSS-REFERENCE TO RELATED APPLICATIONS

The application claims priority and the benefit, under 35 U.S.C. §119, of U.S. Provisional Patent Application No. 61/695,051, filed 30 Aug. 2013, the contents and substance of which are incorporated by reference as if fully set forth below.

BACKGROUND

Offshore drilling platforms, undersea oil and gas exploration structures, and other offshore and underwater activities require reliable, efficient sources of power for their operations. Many offshore operations involve large motors that require a high volume of power. These operations may be located miles offshore or at significant depths. Accordingly, there is an increased desire to find cost-effective, reliable systems for delivering power to offshore facilities.

SUMMARY

In one embodiment, a system for delivering power to an offshore load may include an on-land source of three-phase power, an on-land AC-to-DC power conversion module, a DC transmission line, and an offshore DC-to-AC power inverter. The on-land AC-to-DC power conversion module may be configured to convert the three-phase power to DC power. The DC transmission line may have a source end and a load end, where the source end is configured to receive DC power from the on-land AC-to-DC power conversion module. The offshore DC-to-AC power inverter may be configured to receive DC power from the DC transmission line, convert the DC power to three-phase AC power, and deliver the three-phase AC power to an offshore load.

In another embodiment, a method for delivering power to an offshore load may include connecting an on-land source of three-phase power to an on-land AC-to-DC power conversion module configured to convert the three-phase power to DC power. A source end of a DC transmission line may be connected to a DC power output from the on-land AC-to-DC power conversion module. An offshore DC-to-AC power inverter may be configured to receive DC power from the DC transmission line, convert the DC power to three-phase AC power, and deliver three-phase AC power to an offshore load.

DETAILED DESCRIPTION

This disclosure is not limited to the particular systems, devices, and methods described, as these may vary. The terminology used in the description is for the purpose of describing particular versions or embodiments only, and is not intended to limit the scope of this disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used in this document, the term "electrically connected" means that two or more components are part of a circuit such that a current may flow through the components, or the components share a common voltage, either directly or via one or more intermediate components.

As used in this document, the term "offshore" refers to a location that is above or within a body of water. The body of water may be an ocean, a sea, or a large lake, for example. For the purpose of this disclosure, a lake may be considered "large" if it has a surface area of about 1,700 square miles (about 4,400 square km) or larger.

Figure 1:
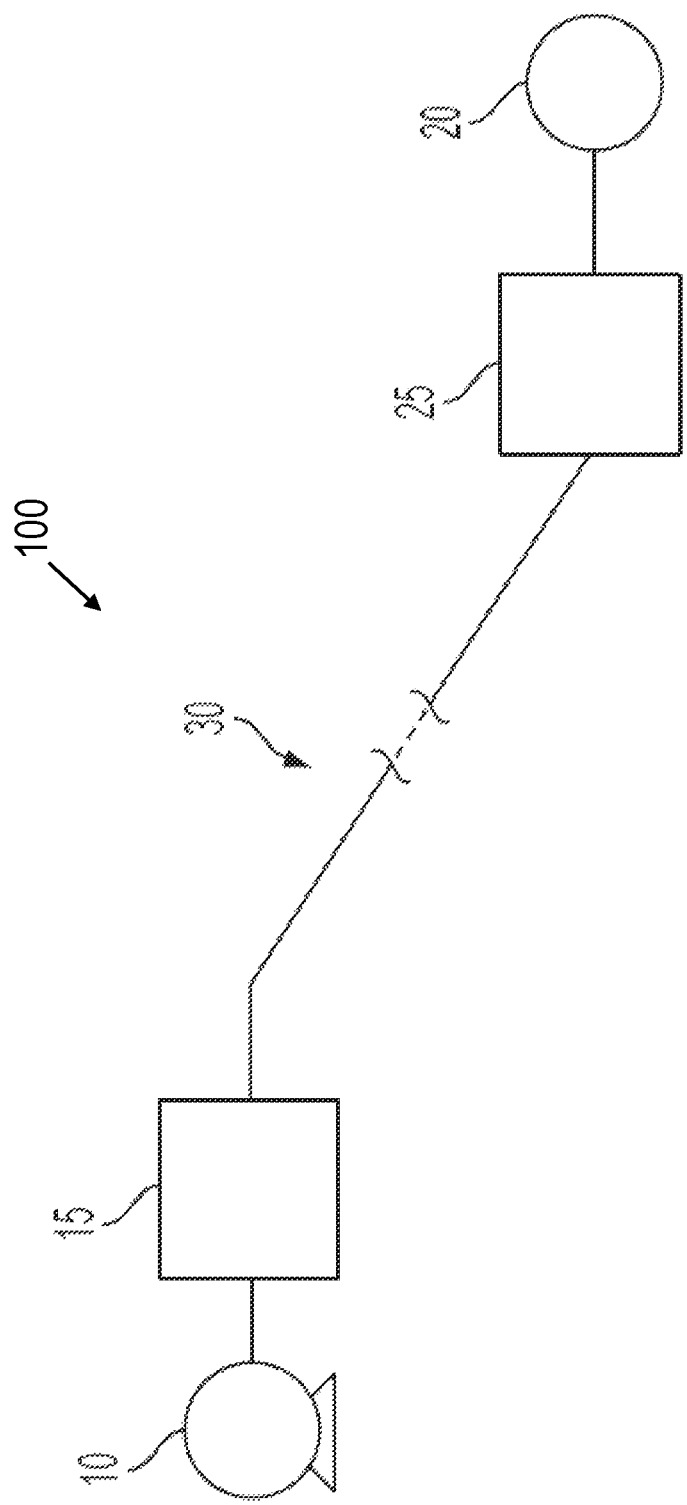
FIG. 1 illustrates various elements of an offshore power delivery system, according to an exemplary embodiment of this disclosure.

FIG. 1 illustrates a power delivery system 100, according to an exemplary embodiment of this disclosure. In an exemplary power delivery system 100, power is supplied from a first alternating current (AC) system to a second AC system via an intermediate direct current (DC) link. As shown, the power delivery system 100 may include a power source 10, a conversion module 15, a load 20, an inverter 25, and a DC transmission line 30. In an exemplary embodiment, the load 20 and the inverter 25 are offshore, while the power source 10 and the conversion module 15 are on land. Thus, for illustrative purposes only, the load 20 is referred to herein as an "offshore load." It will be understood, however, that some embodiments of the power delivery system 100 may be used to deliver power to a land-based load.

The power source 10 may be a three-phase AC power source, such as an electric generator that is powered by a steam turbine, and may be located at a power generation facility on land. The power source 10 may be electrically connected to the conversion module 15, which may be an on-land power conversion module and may include one or more AC-to-DC converters. In some embodiments, the power source 10 may be located on a platform that has a local power generation capability.

The offshore load 20, such as a three-phase motor, may be located on an offshore platform or submerged (e.g., sub-sea) in a waterproof housing. The inverter 25 may be an offshore DC-to-AC inverter, which may deliver three-phase AC power to the offshore load 20. The DC transmission line 30 may transmit DC power from the conversion module 15 to the inverter 25 across a distance, which may be a long distance, such as one mile, two kilometers, or more. The DC transmission line 30 may be of a structure to handle at least medium voltage direct current (MVDC) power (e.g., 4-40 kv) or high voltage direct current (HVDC) power (e.g., 40 kv or higher). The transmission line may be of a type that is monopole with earth return, bipolar, a tripole structure, or another type.

Figure 2:
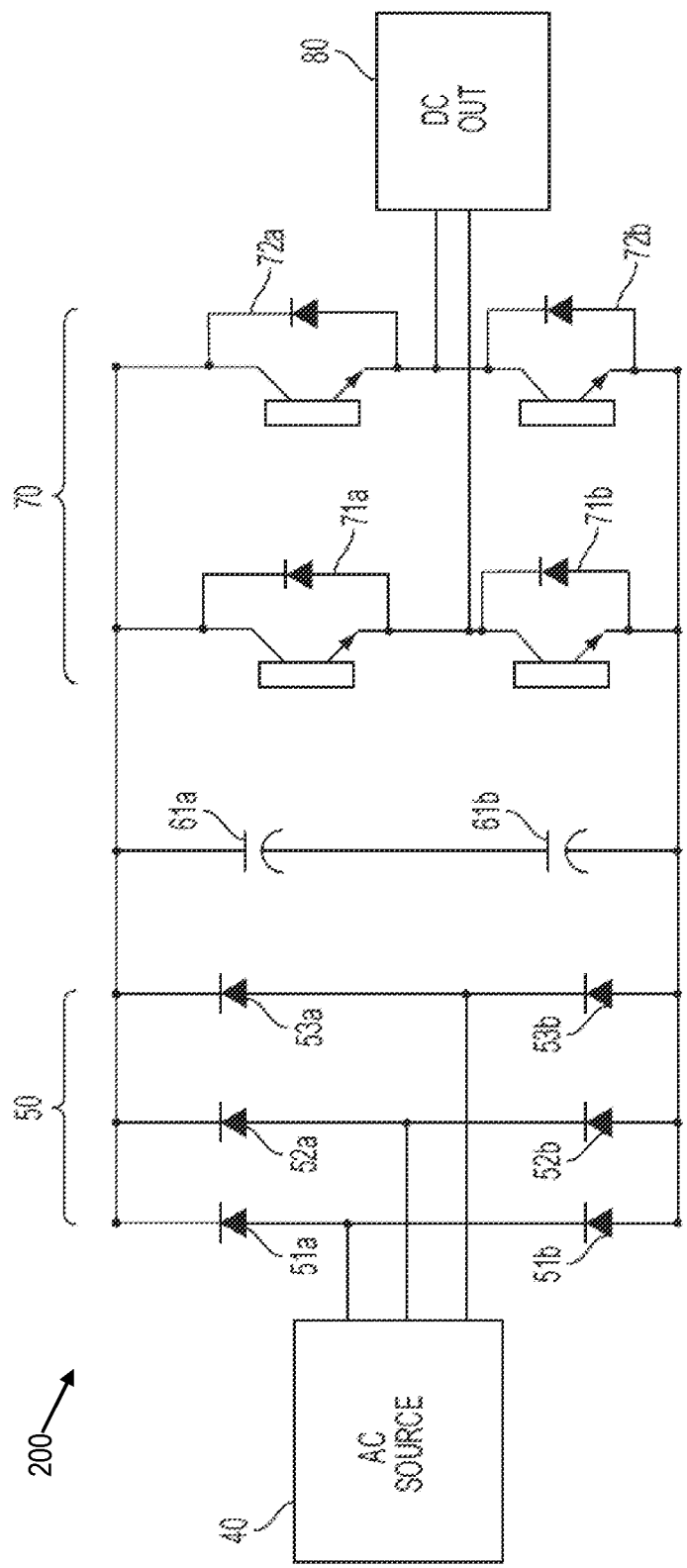
FIG. 2 illustrates elements of a AC-to-DC converter cell, according to an exemplary embodiment of this disclosure.

The conversion module 15 may be an AC-to-DC converter of either current source or voltage source type. As a voltage source conversion module, the conversion module 15 may include two or more converter cells 200 connected in a modular structure. FIG. 2 illustrates an exemplary AC-to-DC converter cell 200 in which a bridge rectifier 50 is formed by a plurality of rectifying diode pairs (51a/51b, 52a/52b, 53a/53b) electrically connected in parallel. One or more smoothing capacitors 61a, 61b and an H-bridge inverter 70 may be connected in parallel with the rectifier 60. The H-bridge inverter 70 may include a set of solid state switch pairs 71a/71b, 72a/72b that are electrically connected in parallel with one another. The conversion module 15 may receive three-phase power from a power source 40, such as power source 10, and convert it to DC output 80. One exemplary system incorporating such converters is discussed in U.S. Pat. No. 5,638,263 to Opal et al., issued 10 Jun. 1997, the disclosure of which is hereby incorporated by reference in its entirety.

Figure 3:
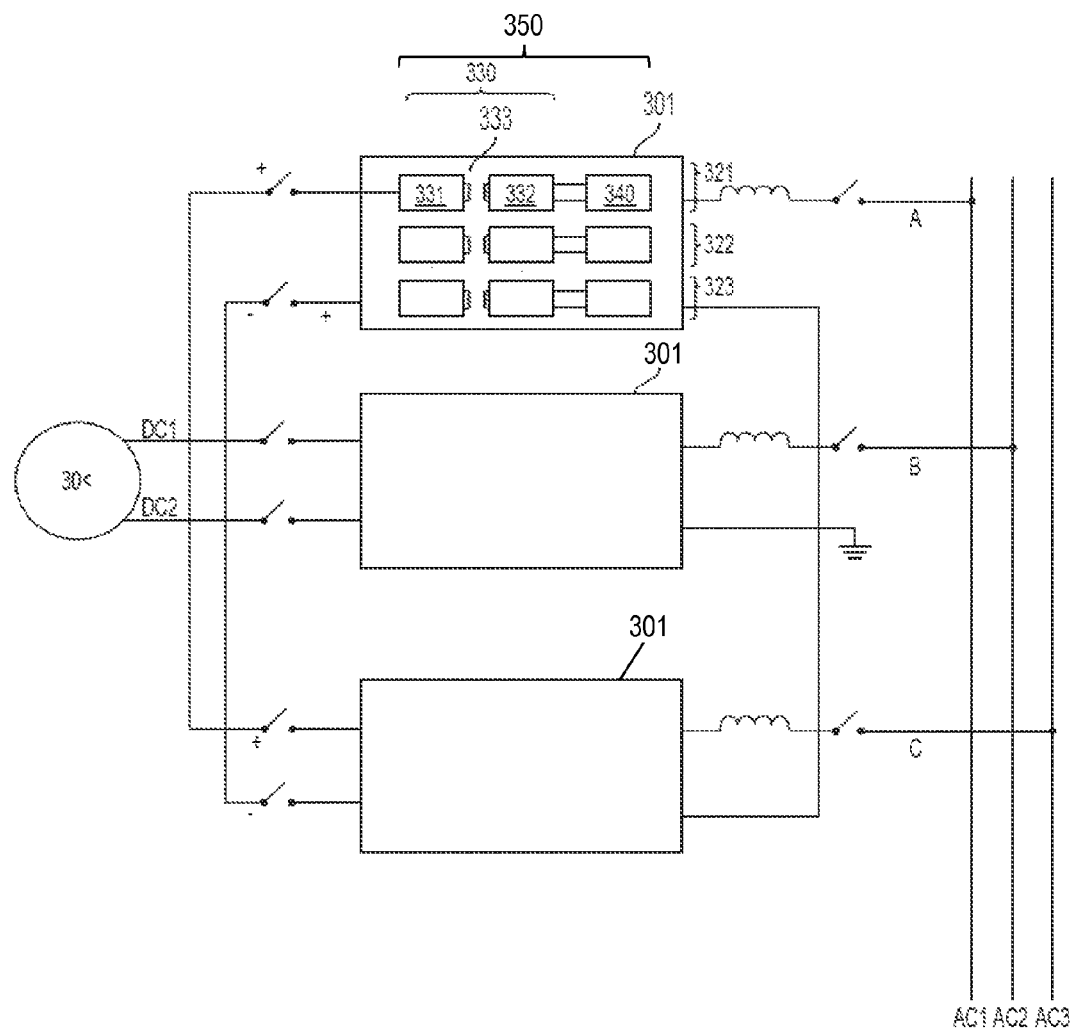
FIG. 3 illustrates elements of a DC-to-AC inverter, according to an exemplary embodiment of this disclosure.

FIG. 3 illustrates the inverter 25, according to an exemplary embodiment. The inverter 25, which may be positioned offshore, may include a plurality of inverter cell modules 301. In some embodiments, the inverter 25 may be a set of inverter cell modules 301 using a reverse topology of that shown in FIG. 2. In some other embodiments, as shown in FIG. 3, a set of three inverter cell modules 301 connected in parallel receive DC current from a source 305 (e.g., the DC transmission line 30 of FIG. 1). Each inverter cell module 301 may include a series of one or more interconnected converter sections (see, e.g. sections 321-323 for the topmost module 301 as shown in FIG. 3). Although three sections are shown for each inverter cell module 301, various quantities of sections may be employed. Each section (e.g., section 321) of an inverter cell module 301 of the inverter 25 may include a DC-to-AC inverter unit 350, which may include a DC-to-DC converter unit 330 and a DC-to-AC converter unit 340. Each DC-to-DC converter unit 330 may include a full H-bridge DC-to-AC converter block 331, a full H-bridge AC-to-DC converter block 332, and a transformer 333 that is electrically connected between the DC-to-AC converter block 331 and the AC-to-DC converter block 332. The transformer 333 may be a medium- or high-frequency transformer and provides galvanic isolation.

Figure 4:
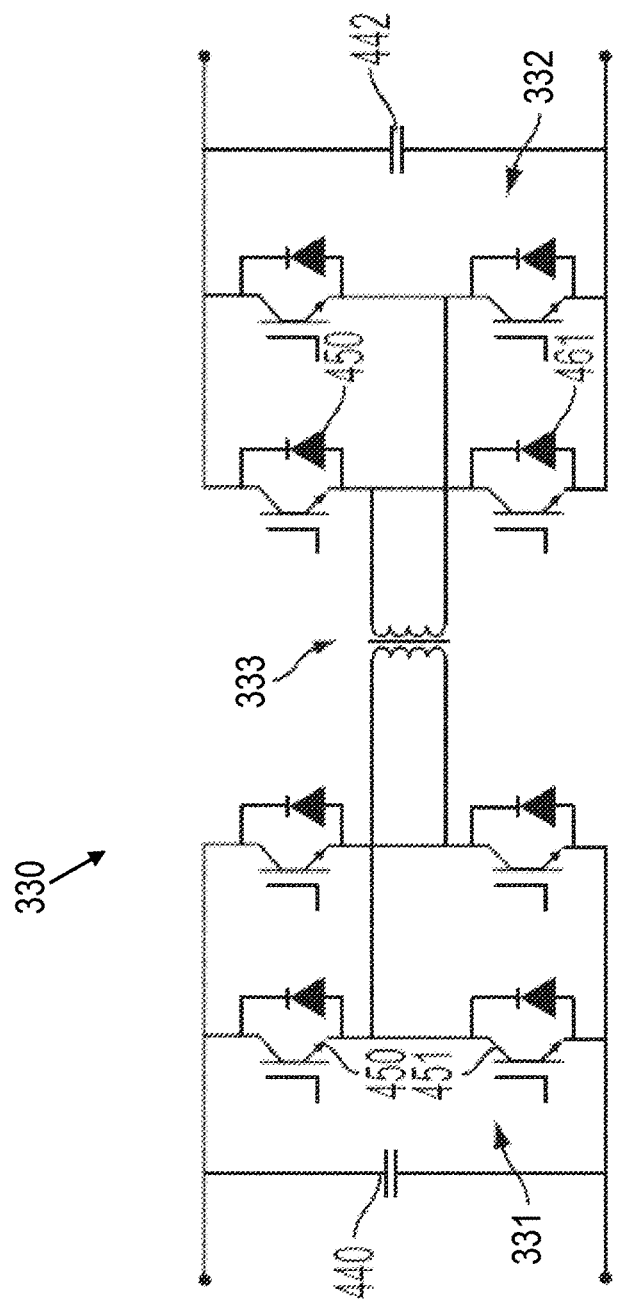
FIG. 4 illustrates a topology of a DC-to-DC converter unit, according to an exemplary embodiment of this disclosure.

FIG. 4 illustrates a topology of an exemplary DC-to-DC converter unit 330 of the inverter 25, according to some exemplary embodiments. In the DC-to-DC converter unit 330, a DC-to-AC converter block 331 may include a capacitor 440 connected in parallel with two or more sets of solid state switch pairs 450, 451. An AC-to-DC converter block 332 may also include a capacitor 442 connected in parallel with two or more sets of solid state switch pairs 460, 461. A transformer 333 provides galvanic isolation between the DC-to-AC converter block 331 and the AC-to-DC converter block 332.

Figure 5:
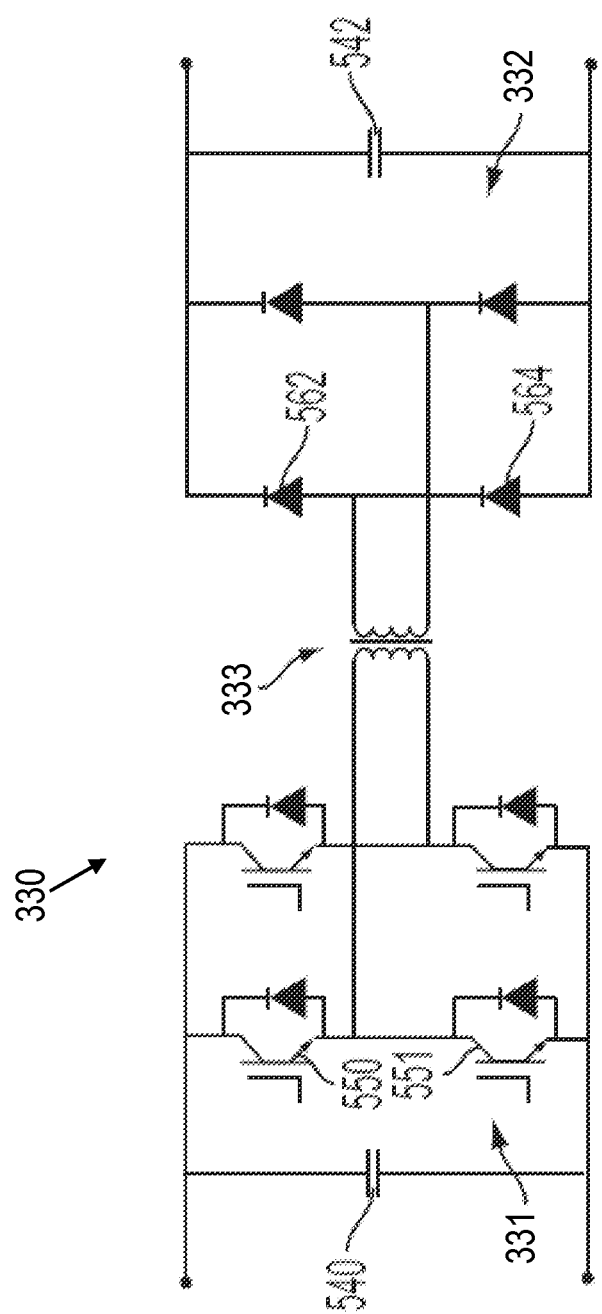
FIG. 5 illustrates a topology of an alternate DC-to-DC converter unit, according to an exemplary embodiment of this disclosure.

FIG. 5 illustrates an alternate exemplary topology of the DC-to-DC converter unit 330 of the inverter 25, in which a DC-to-AC converter block 331 may include a capacitor 540 connected in parallel with two or more sets of solid state switch pairs 550, 551. An AC-to-DC converter block 332 may include a capacitor 542 connected in parallel with two or more sets of diode pairs 562, 564. A transformer 333 provides galvanic isolation between the DC-to-AC converter block 331 and the AC-to-DC converter block 332.

Figure 7:
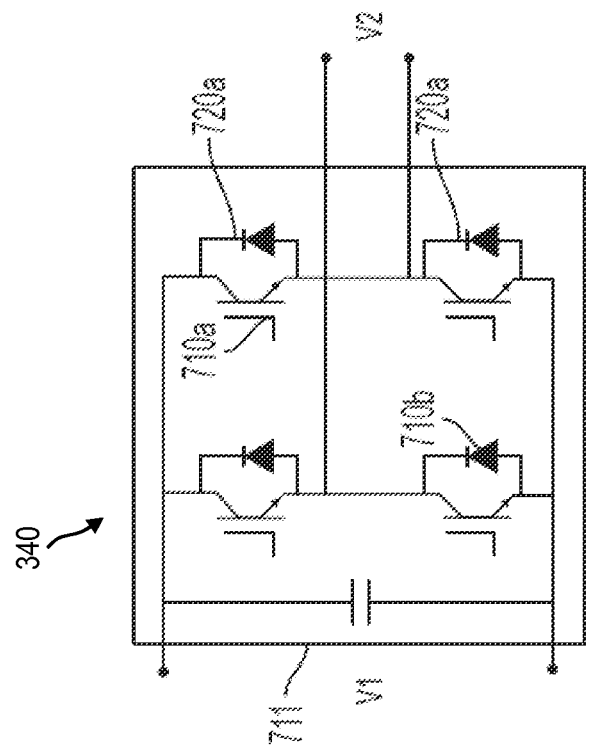
FIG. 7 illustrates a topology of an alternate DC-to-AC converter unit, according to an exemplary embodiment of this disclosure.
Figure 6:
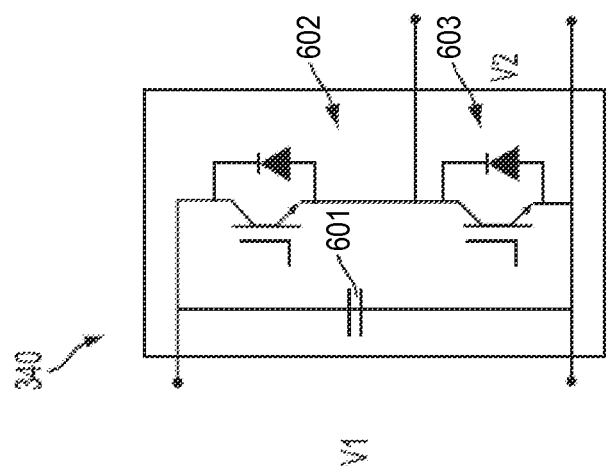
FIG. 6 illustrates a topology of a DC-to-AC converter unit, according to an exemplary embodiment of this disclosure.

FIGS. 6-7 illustrate alternate exemplary topologies of a DC-to-AC converter unit 330 of the inverter 25, according to some exemplary embodiments. As shown in FIG. 6, the DC-to-AC converter unit 340 may include, for example, a pair of solid state switches 602, 603 connected with each other in series, but in parallel with a capacitor 601. Alternatively, as shown in FIG. 7, two pairs of solid state switches 710a, 710b and 720a, 720b may be connected in parallel with a capacitor 711 to form an H-bridge inverter.

Figure 8:
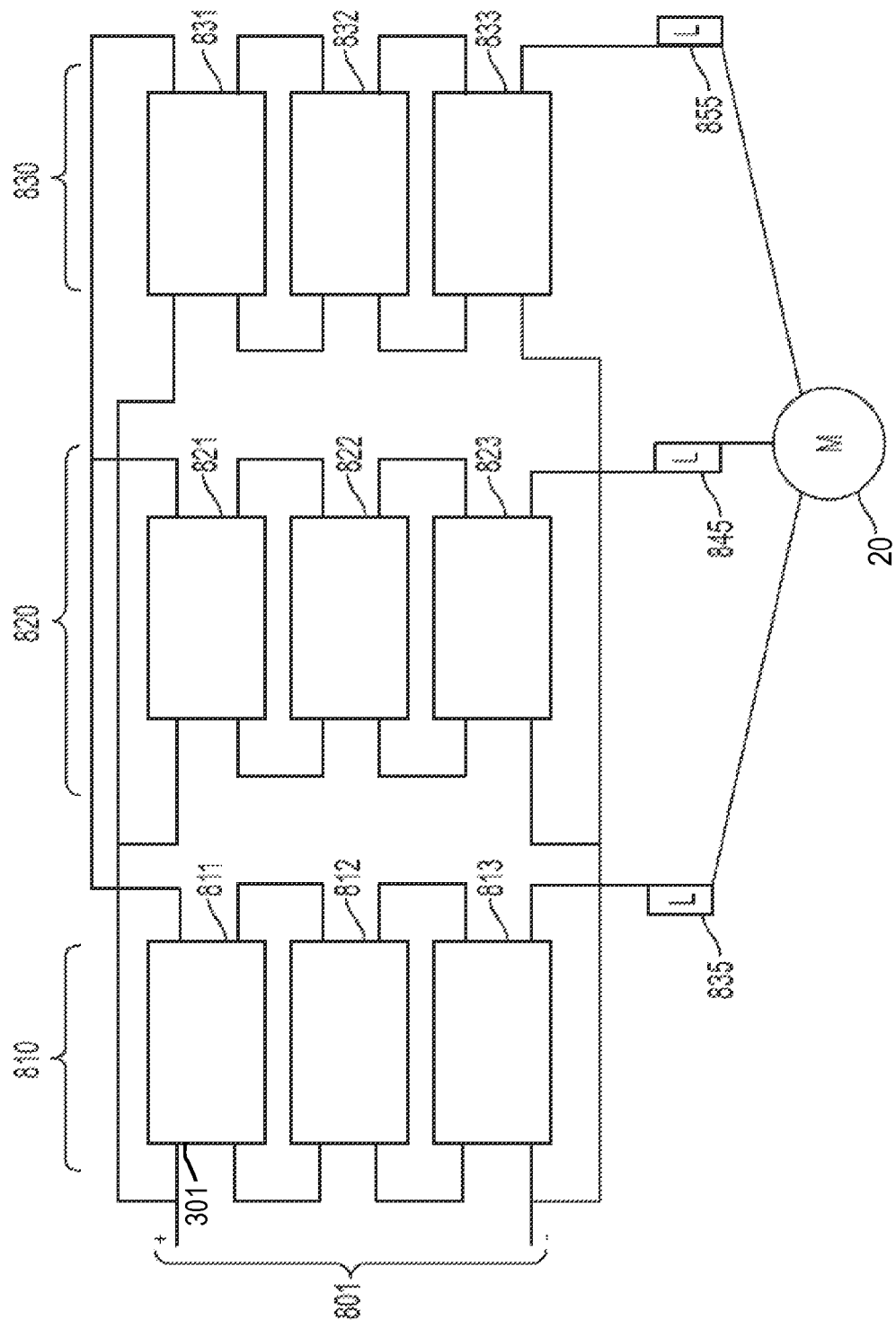
FIG. 8 illustrates a topology of inverter cell modules interconnected to form the inverter, according to an exemplary embodiment of this disclosure.

FIG. 8 illustrates how a topology of inverter cell modules 301 may be interconnected to form all or a portion of the inverter 25, according to an exemplary embodiment. As shown in FIG. 8, a DC input 801 may deliver power to three ranks 810, 820, 830 of inverter cell modules 301. The three ranks 810, 820, 830 may include various quantities of inverter cell modules 301, depicted as 811-813, 821-823, 831-833 in the topology of FIG. 8, such that the cell inputs of each rank 810, 820, 830 are electrically connected in series with one another, while the three ranks 810, 820, 830 are electrically connected in parallel with one another. Each rank 810, 820, 830 may provide an output 835, 845, 855 that makes up one phase of the three-phase AC power delivered to the load 20. Thus, voltage stress from the DC input 801 to the three ranks 810, 820, 830 of inverter cell modules may be reduced.

Figure 9:
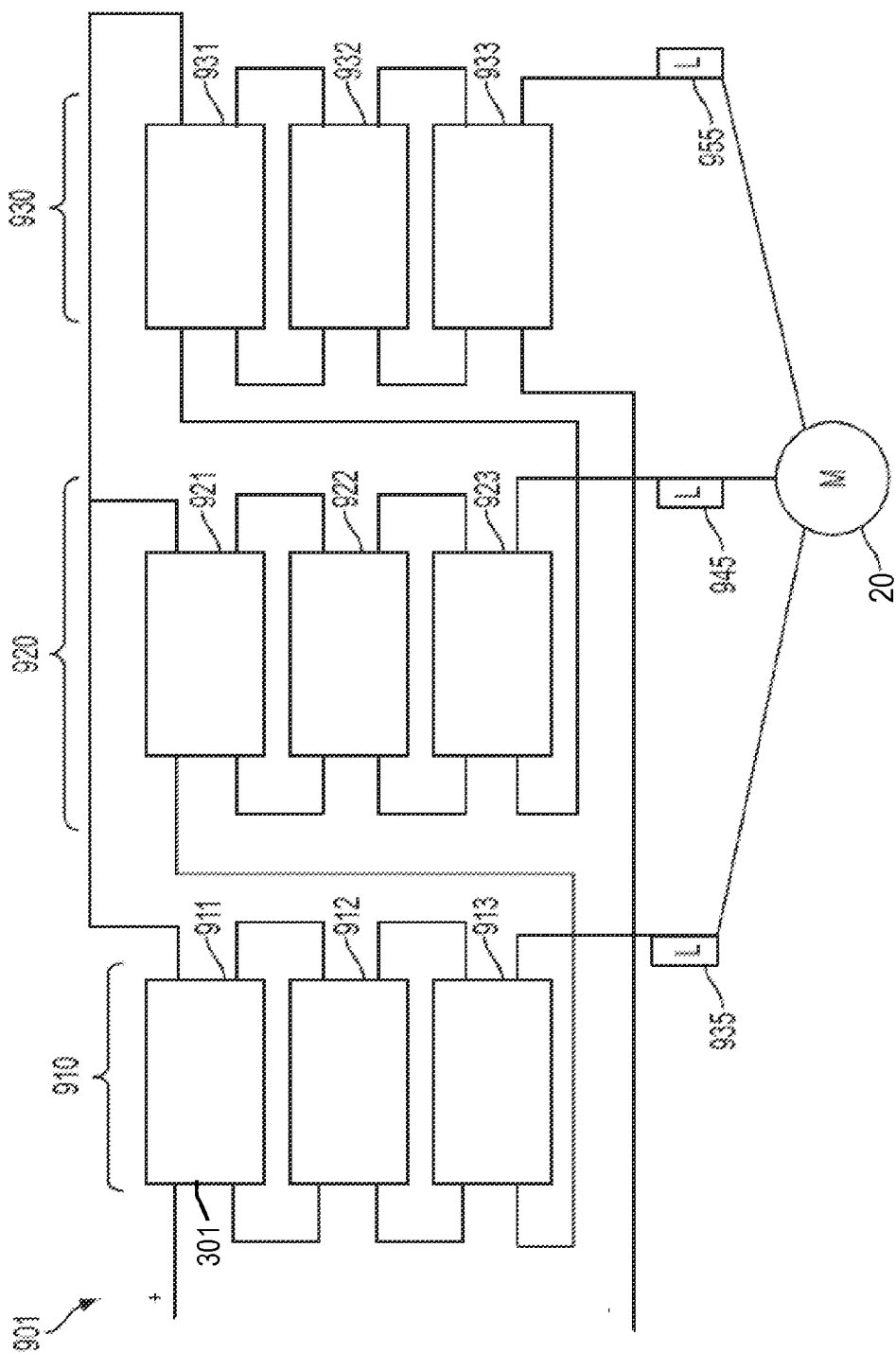
FIG. 9 illustrates an alternate topology of inverter cell modules interconnected to form the inverter, according to an exemplary embodiment of this disclosure.

FIG. 9 illustrates an alternate topology of inverter cell modules 301 that may form all or a portion of the inverter 25. As shown in FIG. 9, the DC input 901 may deliver power to three ranks 910, 920, 930 of inverter cell modules 301. The three ranks 910, 920, 930 may include various quantities of inverter cell modules 301, depicted as 911-913, 921-923, 931-933 in the topology of FIG. 9, such that the cell inputs of each rank 910, 920, 930 are electrically connected in series with one another, and such that the three ranks 910, 920, 930 are also electrically connected in series with one another. Each rank 910, 920, 930 may provide an output 935, 945, 955 that makes up one phase of the three-phase AC power delivered to the load 20. The outputs 935, 945, 955 may therefore create a Y-connection. Thus, the same current at the DC input 901 to each of the three ranks 910, 920, 930 of inverter cell modules and less overall current may result in a decreased loss in the umbilical.

Figure 10:
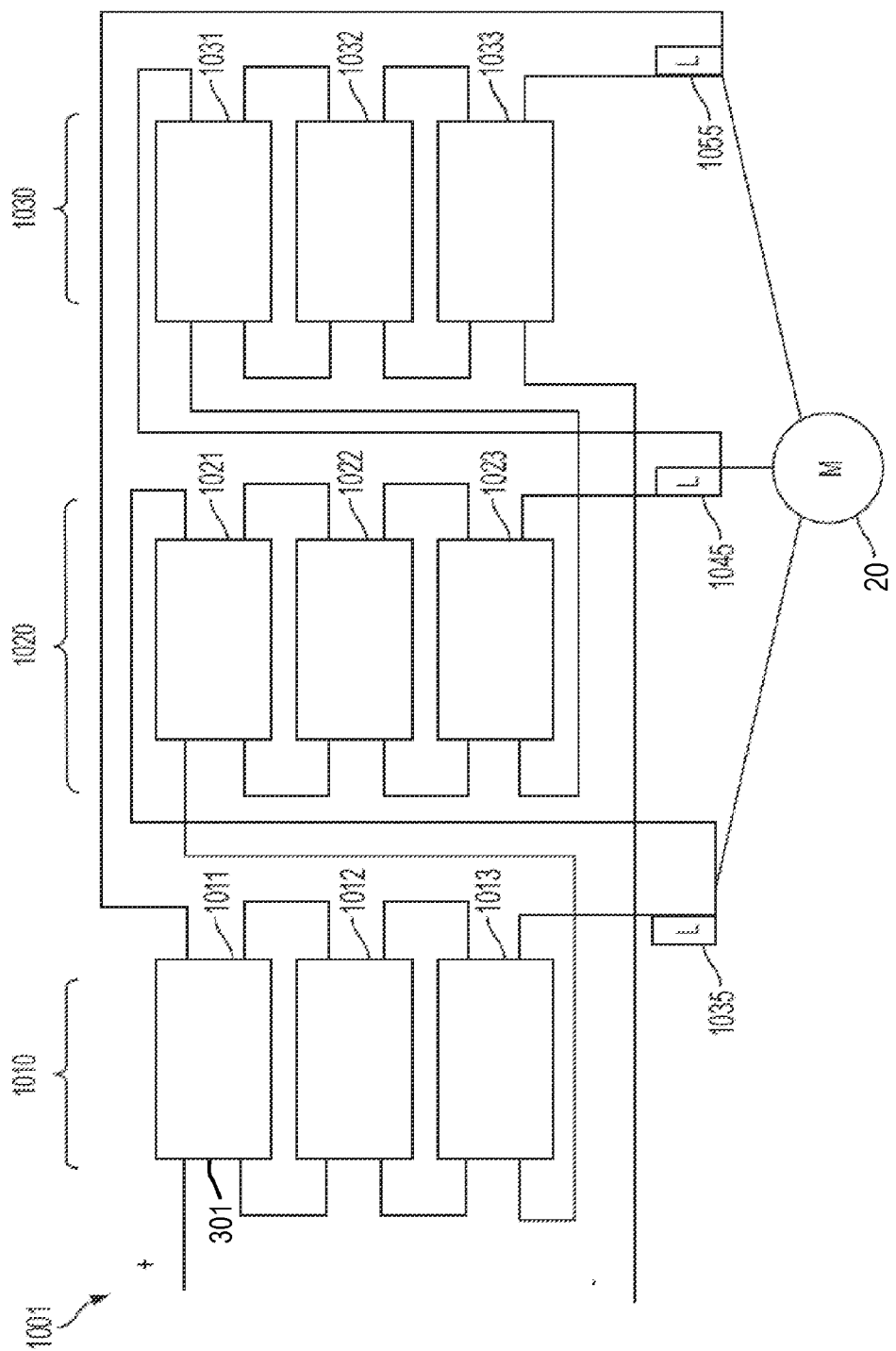
FIG. 10 illustrates another alternate topology of inverter cell modules interconnected to form the inverter, according to an exemplary embodiment of this disclosure.

FIG. 10 illustrates an alternate topology of inverter cell modules 301 that may form the inverter 25. As shown in FIG. 10, the DC input 1001 may deliver power to three ranks 1010, 1020, 1030 of inverter cell modules 301, depicted as 1011-1013, 1021-1023, 1031-1033 in the topology of FIG. 10. The three ranks 1010, 1020, 1030 may include various quantities of modules such that the cell inputs of each rank are electrically connected in series with each other, while the three ranks are electrically connected on the outputs as a mesh so that each rank 1010, 1020, 1030 helps make up two phases of each of the three phases 1035, 1045, 1055 of AC power delivered to the load 20. The outputs thus may create a delta connection.

Figure 11:
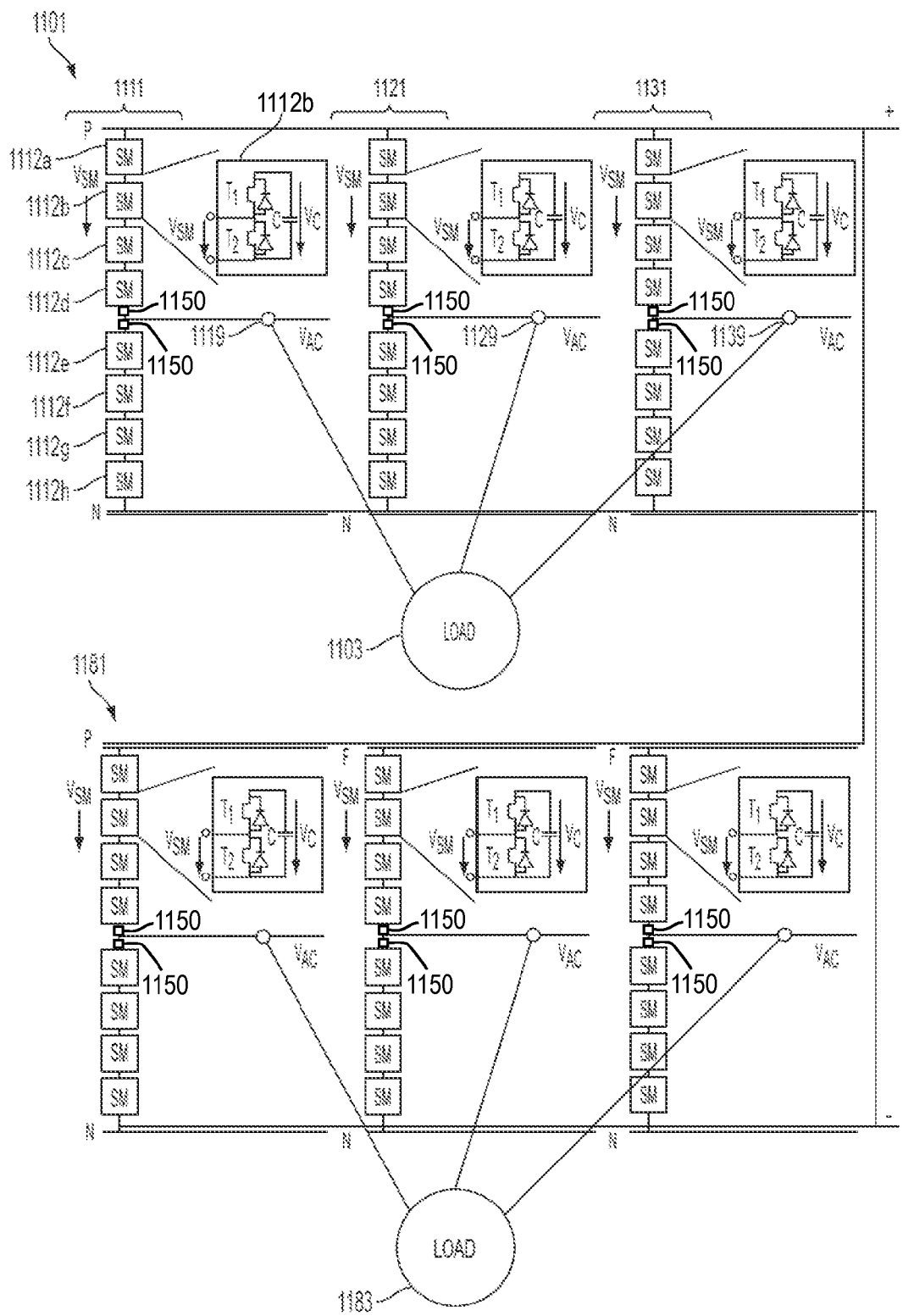
FIG. 11 illustrates how alternative parallel-connected converters may form the inverter, according to an exemplary embodiment of this disclosure.

FIG. 11 illustrates an alternate exemplary embodiment of the inverter 25. In this embodiment, two or more modular multilevel converter systems 1101, 1181 are connected in parallel to a DC power source (identified by the P-N inputs) to form the inverter 25, for delivering power to two or more loads 1103, 1183, such as load 20. Each converter system 1101, 1181 may include three inverter legs 1111, 1121, 1131. Each leg 1111, 1121, 1131 may be made up of a set of series-connected inverter submodules 1112a . . . 1112n, and may include a pair of interphase inductors 1150 as shown. Although FIG. 11 shows eight submodules in each leg, various quantities of submodules 1112a . . . 1112n are possible. Each submodule may serve as a converter element.

Also in FIG. 11, an expanded view of an exemplary submodule 1112b is shown. As shown, the submodule 1112b may include two power semiconductors T1, T2 connected in series, where the semiconductors T1, T2 can be switched on and off. The semiconductors T1, T2, or solid state switches, may be insulated gate bipolar transistors (IGBTs), gate turn-off thyristors (GTOs), integrated gate-commutated thyristors (IGCTs), or the like. Each power semiconductor may have a corresponding diode D1, D2 connected in parallel with it. An energy storage device, such as a capacitor, may be connected in parallel with the semiconductors T1, T2 and diodes D1, D2. Additional details about such an exemplary submodule 1112b are disclosed in U.S. Pat. No. 7,269,037 to Marquardt, issued 11 Sep. 2007, and U.S. Pat. No. 7,960,871 to Dommaschk et al., issued 14 Jun. 20122, the relevant disclosures of which are incorporated herein by reference.

Each inverter leg 1111, 1121, 1131 may have a single-phase AC output 1119, 1129, 1139 that supplies one phase of the three-phase power for the load 1103. The AC output may be positioned at a midpoint such that an equal number of submodules 1112a, . . . 1112n are on either side of the AC output's electrical connection to the leg 1111, 1121, 1131.

The inverter 25 described above may deliver power to a single load 20, or to multiple loads. In submerged applications for offshore loads, the inverter 25 may be housed in a waterproof container. An advantage of the inverter cell modules 301 described herein, in some embodiments, is that the modules 301 may use a DC input and a high frequency isolation transformer 333. The size of the transformer 333 may be inversely proportional to the frequency. Thus, the size of the transformer 333 may decrease as the frequency increases. This may allow the transformer 333 to be a portion of the conversion module 15, in some embodiments, as described herein. In the present disclosure, the transformer 333 may be about fifty percent to about sixty percent reduced in size from those used in conventional power delivery. However, those skilled in the art will recognize that other sizes may be used without departing from the scope of the present disclosure. As a result, the size of the submerged compartment carrying the inverter 25 may be reduced as compared to conventional power delivery mechanisms.

Various of the above-disclosed and other features and functions, or alternatives thereof, may be combined into many other systems or applications. Various presently unforeseen or unanticipated alternatives, modifications, variations, or improvements therein may be subsequently made by those skilled in the art, each of which is also intended to be encompassed by this disclosure.

The invention claimed is:

1. A system for delivering power to an offshore load, the system comprising:
    an on-land source of three-phase power;
    an on-land AC-to-DC power conversion module configured to convert the three-phase power to DC power;
    a DC transmission line having a source end and a load end, wherein the source end is configured to receive DC power from the on-land AC-to-DC power conversion module; and
    an offshore DC-to-AC power inverter configured to receive DC power from the DC transmission line, convert the DC power to three-phase AC power, and deliver the three-phase AC power to an offshore load,
    the offshore DC-to-AC power inverter further comprising a plurality of converter sections, and each converter section comprising:
        a DC-to-AC converter unit; and
        a DC-to-DC converter unit, comprising:
            an H-bridge AC-to-DC converter block that provides a DC output;
            an H-bridge DC-to-AC converter block that receives a DC input; and
            a transformer electrically connected between the DC-to-AC converter block and the AC-to-DC converter block.

2. The system of claim 1, wherein the on-land AC-to-DC power conversion modules comprises a plurality of AC-to-DC power converter cells.

3. The system of claim 1, the DC-to-AC converter block comprising a set of solid state switch pairs, wherein the DC-to-AC converter block receives the DC output and converts the DC output to a single phase AC output.

4. The system of claim 3, the DC-to-AC converter block further comprising a capacitor connected in parallel with the set of solid state switch pairs.

5. The system of claim 3, the DC-to-AC converter block further comprising a capacitor connected in parallel with a plurality of sets of diode devices.

6. The system of claim 1, further comprising a plurality of ranks connected between the transformer and the AC-to-DC converter block, wherein each of the plurality of ranks includes one or more modules that receive the DC input in series, and wherein the plurality of ranks are connected.

7. The system of claim 1, further comprising a plurality of ranks connected between the transformer and the AC-to-DC converter block, wherein each of the plurality of ranks includes one or more modules that receive the DC input in series, and wherein the plurality of ranks provides the DC output as a mesh.

8. The system of claim 1, the offshore DC-to-AC power inverter further comprising:
    a three-phase system comprising three legs electrically connected in parallel to the DC transmission line;
    wherein each leg comprises a series circuit of submodules, each submodule comprising a series-connected pair of power semiconductors electrically connected in parallel with a power storage device; and
    wherein each phase of the three-phase system provides a single phase AC output that comprises one of the three phases of AC power delivered to the offshore load.

9. The system of claim 1, the offshore DC-to-AC power inverter further comprising:
    a three-phase system comprising three legs electrically connected in parallel to the DC transmission line;
    wherein each leg comprises a series circuit of submodules, each submodule comprising a series-connected pair of power semiconductors electrically connected in parallel with a power storage device; and
    wherein each phase of the three-phase system provides a single phase AC output that is electrically connected to a second offshore load.

10. A method for delivering power to an offshore load, the method comprising:
    connecting an on-land source of three-phase power to an on-land AC-to-DC power conversion module configured to convert the three-phase power to DC power;
    connecting a source end of a DC transmission line to a DC power output from the on-land AC-to-DC power conversion module; and configuring an offshore DC-to-AC power inverter to receive DC power from the DC transmission line, convert the DC power to three-phase AC power, and deliver three-phase AC power to an offshore load, wherein the DC-to-AC power inverter further comprises a plurality of converter sections, wherein each converter section comprises a DC-to-AC converter unit and a DC-to-DC converter unit, further comprising:
configuring an H-bridge AC-to-DC converter block to provide a DC output;
configuring an H-bridge DC-to-AC converter block to receives a DC input; and
electrically connecting a transformer between the DC-to-AC converter block and the AC-to-DC converter block.

11. The method of claim 10, wherein the on-land AC-to-DC power conversion modules comprises a plurality of AC-to-DC power converter cells.

12. The method of claim 10, wherein the DC-to-AC converter block comprises a set of solid state switch pairs, and wherein the DC-to-AC converter block receives the DC output and converts the DC output to a single phase AC output.

13. The method of claim 12, wherein the DC-to-AC converter block further comprises a capacitor connected in parallel with the set of solid state switch pairs.

14. The method of claim 12, wherein the DC-to-AC converter block further comprises a capacitor connected in parallel with a plurality of sets of diode devices.

15. The method of claim 10, wherein the inverter further comprises a plurality of ranks connected between the transformer and the AC-to-DC converter block, wherein each of the plurality of ranks includes one or more modules that receive the DC input in series, and wherein the plurality of ranks are connected.

16. The method of claim 10, wherein the inverter further comprises a plurality of ranks connected between the transformer and the AC-to-DC converter block, wherein each of the plurality of ranks includes one or more modules that receive the DC input in series, and wherein the plurality of ranks provides the DC output as a mesh.

17. The method of claim 10, further comprising:
providing a three-phase system by, at least, electrically connecting three legs in parallel to the DC transmission line;
wherein each leg comprises a series circuit of submodules, each submodule comprising a series-connected pair of power semiconductors electrically connected in parallel with a power storage device; and
wherein each phase of the three-phase system provides a single phase AC output that comprises one of the three phases of AC power delivered to the offshore load.

18. The method of claim 10, further comprising:
providing a three-phase system by, at least, electrically connecting three legs in parallel to the DC transmission line;
wherein each leg comprises a series circuit of submodules, each submodule comprising a series-connected pair of power semiconductors electrically connected in parallel with a power storage device; and
wherein each phase of the three-phase system provides a single phase AC output that is electrically connected to a second offshore load.

* * * * *